(12) United States Patent
Lortz

(10) Patent No.: US 7,047,554 B1
(45) Date of Patent: May 16, 2006

(54) SYSTEM AND METHOD FOR INTEGRATING AND CONTROLLING AUDIO/VIDEO DEVICES

(75) Inventor: Victor B. Lortz, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/208,064

(22) Filed: Dec. 9, 1998

(51) Int. Cl.
*H04N 7/173* (2006.01)

(52) U.S. Cl. .......................... 725/149; 725/74; 725/82; 725/116; 725/117

(58) Field of Classification Search ................ 725/115, 725/116, 117, 118, 74, 82, 149; 348/569, 348/734
See application file for complete search history.

(56) References Cited

U.S. PATENT DOCUMENTS

| | | | | |
|---|---|---|---|---|
| 5,202,989 A | * | 4/1993 | Hirosawa et al. | 395/650 |
| 5,247,580 A | * | 9/1993 | Kimura et al. | 381/43 |
| 5,418,527 A | * | 5/1995 | Yashiro | 340/825.24 |
| 5,420,573 A | * | 5/1995 | Tanaka et al. | 340/825.54 |
| 5,583,560 A | * | 12/1996 | Florin et al. | 725/87 |
| 5,699,052 A | * | 12/1997 | Miyahara | 340/825.25 |
| 5,815,689 A | * | 9/1998 | Shaw et al. | 713/400 |
| 6,016,515 A | * | 1/2000 | Shaw et al. | 719/321 |
| 6,081,533 A | * | 6/2000 | Laubach et al. | 370/421 |
| 6,209,041 B1 | * | 3/2001 | Shaw et al. | 719/321 |
| 6,226,038 B1 | * | 5/2001 | Frink et al. | 348/443 |

* cited by examiner

*Primary Examiner*—Kieu-Oanh Bui
(74) *Attorney, Agent, or Firm*—Kenyon & Kenyon LLP

(57) ABSTRACT

A processor integrating and controlling at least two A/V devices by constructing a control model, referred to as a filter graph, of the at least two A/V devices as a function of a physical connection topology of the at least two A/V devices and a desired content to be rendered by one of the at least two A/V devices. The filter graph may be constructed as a function of at least two device filters corresponding to the at least two A/V devices, in which the device filters include certain characteristics of the at least two A/V device. These characteristics may include the input or output pins for each device, the media type that the A/V device may process, the type of functions that the device may serve, etc. The desired content may be received as a user input which is entered via a keyboard, mouse or other comparable input devices. In addition, the user input may be entered as a voice command, which may be parsed by the processor using conventional speech recognition algorithms or natural language processing to extract the necessary information. Once the filter graph is constructed, the processor may control the at least two A/V devices via the filter graph by invoking predetermined operations on the filter graph resulting in the appropriate commands being sent to the at least two A/V devices, thereby results in the rendering of the desired content.

30 Claims, 7 Drawing Sheets

DEVICE FILTERS TABLE

| NAME | PINS | LOCATION |
|---|---|---|
| Set_top_box | VideoOut | Living Room |
| VCR | VideoIn, VideoOut | Living Room |
| ... | ... | ... |
| TV_1 | VideoIn, AuxIn | Living Room |

PINS TABLE

| PIN IDENTIFIER | MEDIA TYPE | SUPPORTED FUNCTIONS (ACTIVITY VERBS) |
|---|---|---|
| Set_top_box.VideoOut | Video | Watch |
| VCR.VideoIn | Video | Record |
| VCR.VideoOut | Video | Play |
| ... | ... | ... |
| TV_1.VideoIn | Video | Watch |
| TV_1.AuxIn | Video | Watch |

CONTENTS TABLE

| NAME | SOURCE | SUB-SOURCE | TIME (OPTIONAL) |
|---|---|---|---|
| CNN | SET_TOP_BOX | CHANNEL 15 | ALWAYS |
| I LOVE LUCY | SET_TOP_BOX | CHANNEL 16 | M-F 8:00-8:30 AM |
| ⋮ | | | |
| ABC | TV_1 | CHANNEL 7 | ALWAYS |

FIG. 3      80

TOPOLOGY TABLE

| CONNECTIONS |
|---|
| SET_TOP_BOX.VIDEOOUT-> TV1.VIDEOIN |
| ⋮ |
| VCR.VIDEOOUT->TV1.AUXIN |

FIG. 4      90

ALTERNATE DEVICE FILTERS TABLE

| NAME | PINS | LOCATION |
|---|---|---|
| SET_TOP_BOX | PIN1 | LIVING ROOM |
| VCR | PIN2, PIN3 | LIVING ROOM |
| ⋮ | | |
| TV_1 | PIN4, PIN5 | LIVING ROOM |

FIG. 8      100

ALTERNATE PINS TABLE

| PIN ID | PIN IDENTIFIER | MEDIA TYPE | MEDIUM | SUPPORTED FUNCTIONS (ACTIVITY VERBS) | FLOW TYPE |
|---|---|---|---|---|---|
| PIN1 | SET_TOP_BOX.VIDEOOUT | VIDEO | M1 | WATCH | OUTPUT |
| PIN2 | VCR.VIDEOIN | VIDEO | M3 | RECORD | INPUT |
| PIN3 | VCR.VIDEOOUT | VIDEO | M2 | PLAY | OUTPUT |
| ⋮ | | | | | |
| PIN4 | TV_1.VIDEOIN | VIDEO | M1 | WATCH | INPUT |
| PIN5 | TV_1.AUXIN | VIDEO | M2 | WATCH | OUTPUT |

FIG. 9      110

SYSTEM AND METHOD FOR INTEGRATING AND CONTROLLING AUDIO/VIDEO DEVICES

The present invention pertains to audio/video devices. More particularly, the present invention pertains to a system and method for integrating and controlling audio/video devices via the operation of a processor.

BACKGROUND INFORMATION

As the quality and number of features of audio and video ("A/V") devices have increased, the complexity of integrating and controlling these devices has also increased. It has been a common trend to place the burden of dealing with this ever-increasing complexity primarily upon the end users. This burden will increase as digital A/V devices are slowly integrated with analog A/V devices.

Digital A/V devices, such as those devices that comply with the standards promulgated in IEEE 1394-1995 Standard for a High Performance Serial Bus, P1394/Draft 7.1v1, published Aug. 5, 1994 (and other 1394-based standards such as the Home Audio/Video Interoperabilitiy ("HAVi") Architecture, ver. 0.8, published May 11, 1998), promise benefits such as higher data throughputs, higher quality audio, increased resolution video, decreased data degradation, etc. while also promising ease-of-use. However, the promise of easier-to-use A/V devices can only be fully realized if end users replace all of their existing analog devices with digital devices. For most people, this type of wholesale replacement of existing devices would involve an unrealistic capital investment. In addition, there is no guarantee that all digital devices will fully comply with a single standard such as the IEEE 1394 standard. Therefore, there will undoubtedly be a transition phase for most end users during which their A/V devices may consist of a mixture of analog devices and digital devices that may or may not comply with a single digital standard. And as a result of this disparate mixture of analog and digital devices, configuring and controlling these devices may actually be more difficult.

A first conventional approach to addressing the increasing complexities of A/V devices is through the use of a universal remote control system with macro capabilities. In this system, a remote control device has the capability to receive a set of button-initiated commands (e.g., in order to record a program on channel 7, the user may press a first button to initiate sending commands to a television, press the "7"+Enter button to change the channel to 7, press another button to initiate sending commands to a video cassette recorder ("VCR"), and then press the record button to have the VCR record the program on channel 7) and store these button-initiated commands in a memory device as a macro. Then, at any time, the user only needs to invoke the macro to repeat the set of commands stored therein. Although this macro-type of control system enables an end user to store a complex set of commands and easily repeat them, there are several shortcomings. First, the user must know the proper sequence of commands needed to perform a specific task. Second, the remote control device must be capable of controlling all of the various devices necessary to perform a specific task. Third, any change in the devices or configuration of the devices would require a modification or re-recording of the macros or the remote control device.

In another conventional system, the A/V devices are controlled by a computer using various communications methods to convey command signals to the devices. For example, the devices may be controlled by the computer via a serial cable (e.g., as in the IEEE 1394 standard), an infrared ("I/R") transmitter or a radio frequency ("RF") transmitter. Due to the various communications methods that may be used by the computer to control the A/V devices, this type of system may be used to control both digital and analog A/V devices. Each A/V device is represented as a software object on the computer. These software objects include device-specific command sets which may be accessed by the computer's processor to operate the corresponding A/V devices. Programmers may then write control programs providing a user-friendly interface that allows the user to indirectly access the command sets to control the various A/V devices without any understanding of the software objects or the command sets. However, these conventional systems merely provide an improved interface system for controlling the individual A/V devices, without simplifying the integration process.

In yet another conventional system, the personal computer is implemented as a data router/data termination device for A/V devices. In these systems, data signals from A/V devices are received by the computer, and are either routed to another A/V device or rendered by the computer. For example, a stereo system may send audio signals to the computer, and the computer may send the audio signals to a speaker system that is also connected to the computer. In another example, a VCR may send both audio and video signals to the computer. The computer may then render the video signals on a monitor and route the audio signals to a speaker system. In this manner, the computer controls the A/V devices and is also directly involved in routing the data signals to the appropriate devices.

MICROSOFT®'s DIRECTSHOW™ is an example of a system that implements this type of computer-based system for integrating and controlling A/V-type devices, in which multimedia data is streamed between the devices through the computer. DIRECTSHOW™ processes multimedia data through software objects called filters. Filters are software objects that perform certain tasks required to process the multimedia data, such as reading the multimedia file from a disk, transforming the data, or rendering the multimedia data. Each filter has either an input pin, output pin or both depending on the function the specific filter is performing. The computer runs a filter graph manager that constructs filter graphs, which is a connection of the various filters via their respective pins, to render specific multimedia data. The construction of the filter graph is performed as a function of the type of data that needs to be rendered and the transformations that must be performed before the data can be rendered.

However, applying the current DIRECTSHOW™ system in the home A/V device context would have certain drawbacks. In the DIRECTSHOW™ system, the data is routed through the computer which may be acceptable for controlling computer-related devices, but impractical for controlling devices where there is absolutely no need for the data to pass through the computer. For example, watching a program from a satellite dish on a television does not require that the data be routed through the computer. In addition, DIRECTSHOW™ is limited in its ability to handle certain problems such as widespread distribution of equipment, resource reservation, etc. which will be further discussed below in relation to the present invention.

SUMMARY OF THE INVENTION

A system and method for controlling at least two audio/video ("A/V") devices to render a desired content in which a filter graph is constructed of the at least two A/V devices as a function of a connection topology of the at least two A/V devices and the desired content. Once the filter graph is constructed, the at least two A/V devices may then be controlled via the filter graph to render the desired content on one of the at least two A/V devices.

BRIEF DESCRIPTION OF THE DRAWINGS

FIG. 2A shows an example of a structure of a device filter table.

FIG. 2B shows an example of a structure of a pins table.

FIG. 3 shows an example of a structure of a contents table.

FIG. 4 shows an example of a topology table.

FIG. 8 shows an example of a alternate device filters table.

FIG. 9 shows an example of a alternate pins table.

DETAILED DESCRIPTION

Figure 1:
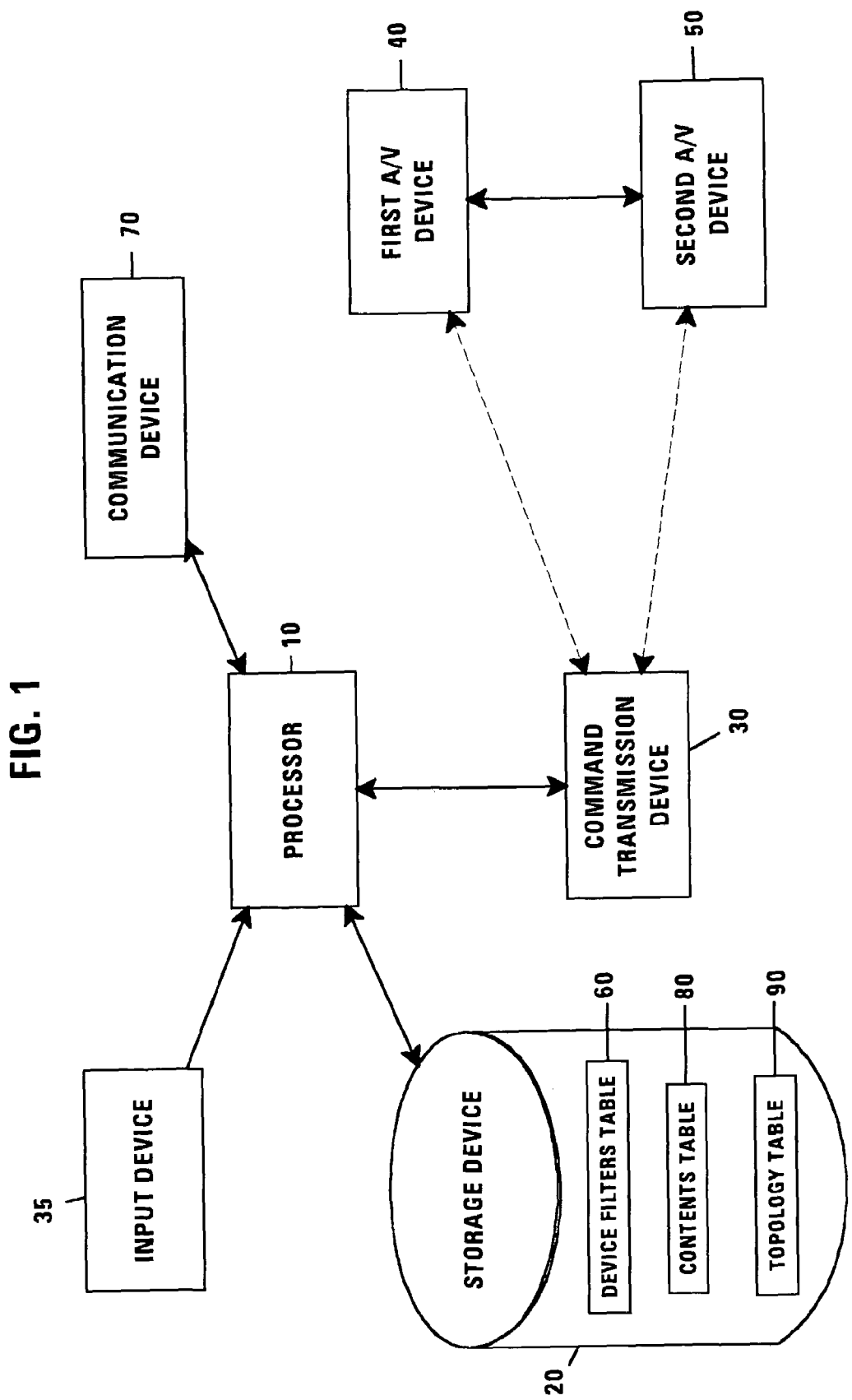
FIG. 1 shows an example of a system according to the present invention.

FIG. 1 shows an example of a system according to the present invention, which includes a processor 10 coupled to a storage device 20, a command transmission means 30 for controlling at least two A/V devices 40, 50, and an input device 35. Command transmission device 30 may include a data communication cable (e.g., serial cable, parallel cable), an I/R (infrared) transmitter, an RF (radio frequency) transmitter, or comparable means. The number and type of command transmission device 30 may vary for each implementation depending on the type of A/V devices that are controlled by the system. For example, if the A/V devices include an IEEE 1394-compliant device 40 such as, for example, a DVD (digital video disk) player, command transmission device 30 may include a serial cable. If the A/V devices also include an analog device 50 such as, for example, an analog television or stereo, command transmission device 30 may also include an I/R transmitter or an RF transmitter. Using this configuration, processor 10 is capable of individually controlling A/V devices 40, 50. Since these types of computer-based control systems are known to those of skill in the art, they will not be discussed in further detail herein.

Input device 35 receives commands from the user. Input device 35 may include, for example, a keyboard, a mouse, a microphone, etc. The keyboard and mouse may be remote devices that communicate with processor 10 via, for example, infrared or radio frequency signals. A microphone may be used with conventional speech recognition algorithms or natural language processing to determine the user input.

Storage device 20 may include a device filters table 60, which may have a structure as shown in FIG. 2A. Each entry in device filters table 60 includes specific characteristics of a corresponding A/V device. For example, each device filter may include fields for its designated name, pins (either input or output, or both), media type, supported functions, and location of the corresponding A/V device. The name may be used to identify the individual A/V device.

The pins for each entry may describe the input and output ports on the corresponding A/V device. Pins may correspond to physical input or output connections on the device, such as the Video In input on an analog television. Pins may also correspond to media connections within a device. For example, a source routing switch for a device may be represented by an internal pin for that device. Furthermore, pins may also be merely representative of connections that the A/V device may accept or provide to other A/V devices. This would be the case in IEEE 1394-compliant devices which communicate with other A/V devices bidirectionally over a serial cable. In these cases, the pins would not represent the actual connections (i.e., the serial cable) which would not be particularly useful for purposes of the present invention, but instead, the pins would represent the type of connections the device may establish with other devices. The location field for each entry may indicate the location (e.g., room) in which each A/V device is located.

Storage device 20 may also store a pins table 62, which may have a structure as shown in FIG. 2B. For each pin associated with a device in the device filters table 60, pins filter table 62 may store specific attributes associated with the pin. The media-type for each entry may indicate the type of data that may be processed by the corresponding pin. For example, the media-type for a stereo system may include Stereo Audio.

The supported functions for each entry may be a verb or verbs that a user would typically employ to describe the actions associated with a corresponding A/V device. For example, the supported functions field in pins table 62 for a pin VideoOut on a set-top box (i.e., the cable converter box) may include "Watch," since the content that is provided by this device is "watched" by the user. The supported functions field in device filters table 60 for a VideoOut pin on a VCR (video cassette recorder) may include "play," since this is a supported function of the VCR. Those skilled in the art will understand that these terms are merely provided as examples, and that other terms may be substituted or added to these terms without departing from the present invention.

Each entry may be entered into device filters table 60 and pins table 62 in various ways. Digital devices may automatically provide the information for a corresponding entry upon being connected to the user's A/V system. Alternatively, processor 10 may also interrogate the digital devices for the requisite information. The entries for analog devices (as well as some digital devices that cannot provide the required information) may be entered manually by the user via input device 35. In addition, the entries may also be downloaded by processor 10 from a remote server (not shown), via a communication device 70. Communication device 70 may include a modem, network interface card, etc.

Storage device 20 may also store a contents table 80, which may have a structure as shown in FIG. 3. Contents table 80 may store entries corresponding to the A/V devices 40, 50 and a corresponding content provided by the respective A/V devices 40, 10. For example, there may be an entry in contents table 80 for the CNN® channel, in which the source A/V device would be the set-top box, and the sub-source would be channel 15. In this manner, the available content may be related to specific sources.

Each entry in contents table 80 may be entered in various ways. Digital devices may be programmed to provide processor 10 with all the content that the digital device may provide, and processor 10 may store them in contents table 80. For analog devices, the user may manually enter all the corresponding content information via the input device. In addition, entries in contents table 80 may be downloaded from a remote server (not shown), via communication device 70. The entries may then be downloaded at regular intervals to keep contents table 80 up-to-date.

Storage device 20 may also store a topology table 90. An example of a topology table 90 is shown in FIG. 4. Unlike the personal computer environment in which all the peripherals are connected to the personal computer and a common bus connects all of the peripherals, each A/V device will most likely not be connected to all other A/V devices. For example, there may be a VCR in one room that is connected to a first television in the same room, but not connected to a second television in another room. The present invention provides topology table 90 to represent these types of connections between the various A/V devices. Topology table 90 represents the connections between the devices using the pins described above with respect to device filters table 60. Accordingly, each entry in topology table 90 corresponds to a specific connection between pins of the various A/V devices. For example, a connection between a set-top box and a television may be represented by the entry "Set_top_box.VideoOut->TV1.VideoIn," which indicates that a video output pin from a filter for the set-top box is connected to the video input pin of a filter for the television. The television may also receive video input from a VCR, which may be represented by the entry "VCR.VideoOut->TV1.Auxin." In this manner, the connection layout (either physical or figurative) of all of the A/V devices may be represented in topology table 90.

As with the other tables 60, 80, the entries in topology table 90 may be entered in various ways. Conventional digital devices currently have sufficient bus enumeration capabilities to support automatic determination of the topology information. Since analog devices do not have this capability, the user will have to manually enter the topology information via input device 35. This task may be simplified by providing a graphical interface which provides a graphic representation of the physical connection ports of the various devices, and the user may use input device 35 to move representative wires to connect the various connection ports. Processor 10 may then interpret the user's inputted connections into the format required for topology table 90.

Figure 5:
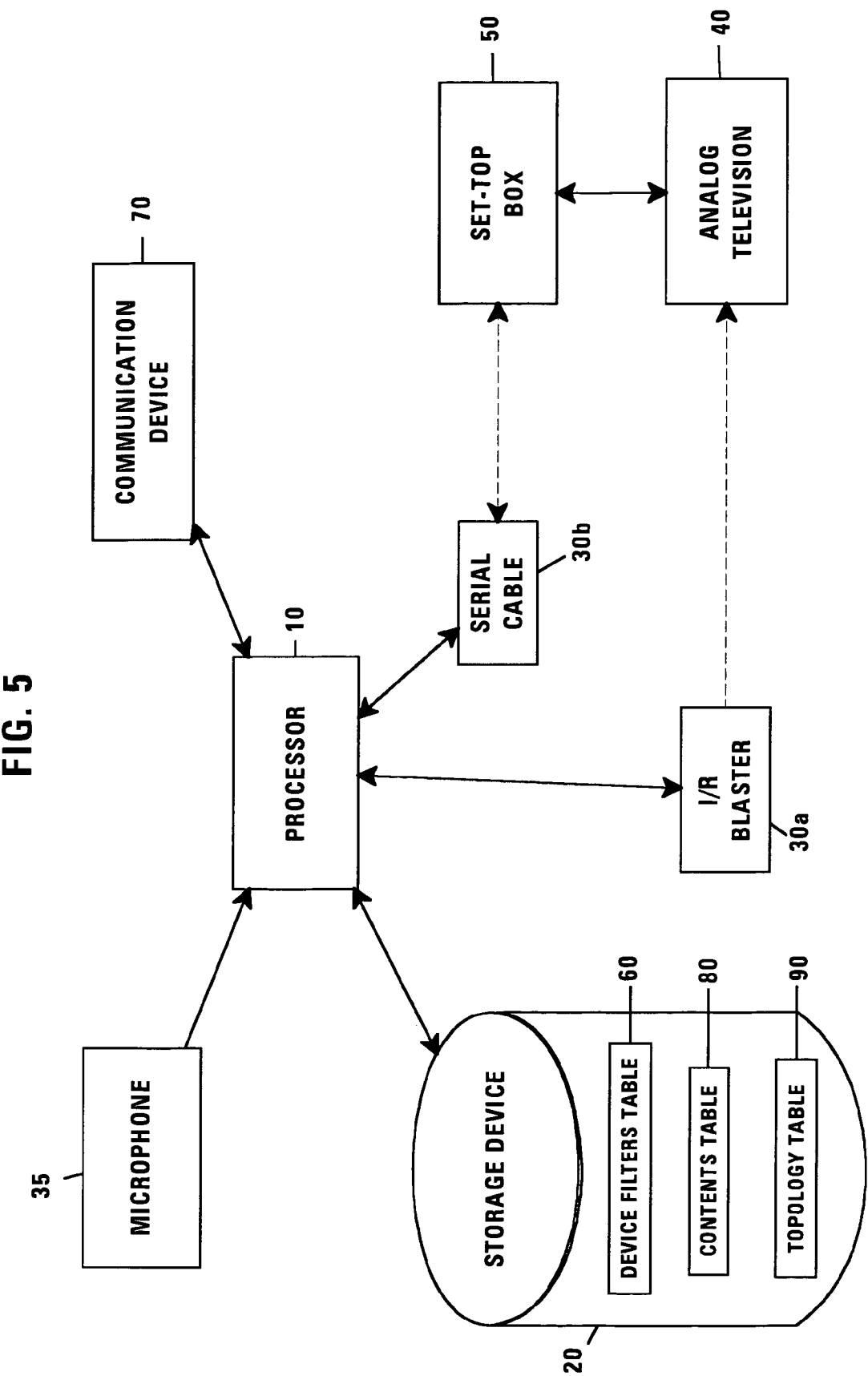
FIG. 5 shows a first embodiment of a system in accordance with the present invention.

FIG. 5 shows a first embodiment of a system in accordance with the present invention, in which processor 10 is coupled to storage device 20, command transmission device 30, a communication device 70, and a microphone 35 for a user input device. Command transmission device 30 includes an I/R transmitter 30a, for controlling an analog television 40, and also includes a serial cable 30b, which couples a digital set-top box 50 to processor 10.

Figure 6:
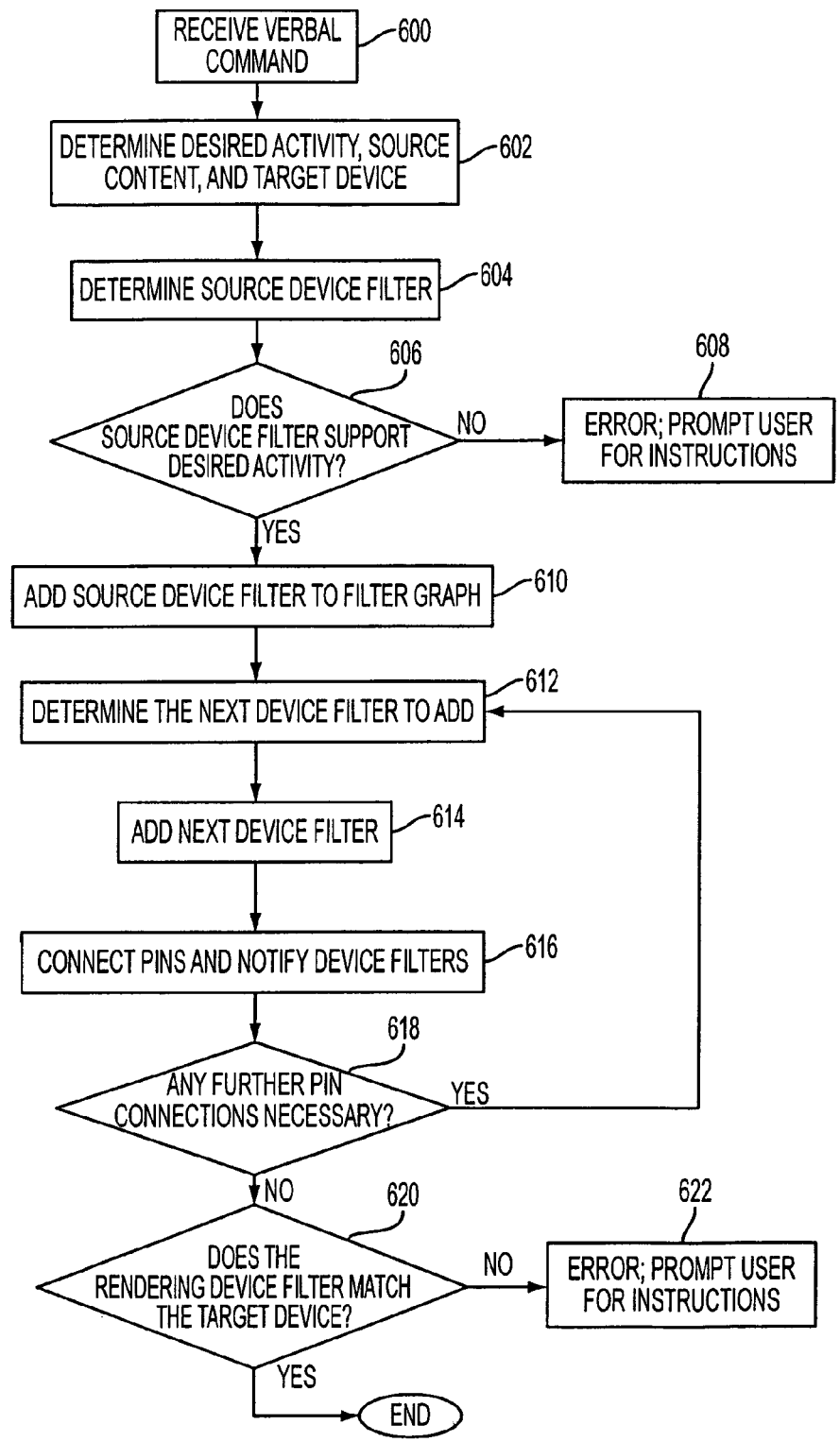
FIG. 6 shows a flowchart for an example of a method for controlling the system of FIG.

FIG. 6 shows a flowchart illustrating an example of a method in accordance with the present invention for controlling the A/V devices in the system of FIG. 5. In step 600, processor 10 receives a verbal command via microphone 35. For purposes of this example, it will be assumed that the verbal command is "Watch CNN® on TV." In step 602, processor 10 processes the verbal command (e.g., through the execution of stored instructions) to determine the desired activity, the name of the source content, and the target device. These may be determined using conventional natural language processing, which is known to those of skill in the art and will not be explained in further detail herein. In this case, processor 10 will determine that the desired activity is "watch," the source content is "CNN®," and the target device is television 40.

In step 604, processor 10 accesses contents table 80 to determine that the source A/V device filter for "CNN" is set-top box 50, and that set-top box 50 needs to be set to channel 15. Since processor 10 has determined that set-top box 50 is the source A/V device filter, processor 10 then accesses device filters table 60 at step 606, and determines whether the device filter for set-top box 50 supports the desired activity (i.e., "watch"). This may be accomplished by accessing pins table 62 and determining which, if any, of the pins associated with set-top box 50 support the desired activity, which is "watching" a program in this example.

If there is no pin associated with the device filter which supports the desired activity, then at step 608, processor 10 provides an error message to the user and prompts the user for further instructions. However, if there is a corresponding pin, as it is in this example since the pin "Set_top_box.VideoOut" supports the activity verb "Watch" in this example, processor 10 then adds this source device filter corresponding to set-top box 50 to a control model, hereinafter referred to as a filter graph, at step 610.

Then at step 612, processor 10 accesses topology table 90 and determines the next device filter to be added based upon the pin determined to support the desired activity at step 608. As discussed above, the device filter for set-top box 50 has an output pin called Set_top_box.VideoOut connected to the input pin on television 40 called TV.VideoIn. Thus, processor 10 may determine in this case that a second device filter corresponding to television 40 must be added to the filter graph, and adds the second device filter at step 614.

Then at step 616, processor 10 connects the necessary pins and notifies the device filters of the connection. This gives the respective device filters for set-top box 50 and television 40 an opportunity to negotiate various predetermined logistics of the connection. For example, for devices conforming to the IEEE 1394 standard, the negotiating may involve negotiating the media type that will be delivered, allocating communication channels, etc. so that set-top box 50 will be prepared to send the proper data, and television 40 will be prepared to receive the data.

Processor 10 may then determine what further pin connections, if any, of the device filters in the filter graph are necessary to accomplish the desired activity at step 618. The information required to make this determination may be encoded into each individual device filter so that each device filter may notify processor 10 of any additional pin connections that may be required. For example, once the TV.VideoIn pin on television 50 device filter is exposed, t elevision 50 device filter may indicate that its audio output pins need to be connected to, for example, a stereo system. If the determination at step 618 is positive, processor 10 may iteratively make connections to the appropriate device filters to accomplish the verbal command by looping back to step 612. If the determination at step 618 is negative, indicating that the filter graph should be complete, the processor 10 may then perform a check to determine if the rendering device filter (i.e., the last device filter in the chain) is the device filter for the target device at step 620. If this determination is positive, then it is assumed that the filter graph connection process is complete. If this determination is negative, then processor 10 may notify the user with an appropriate error message, and prompt the user for instructions at step 622.

Filter graphs are known to those of skill in the art as a representational control model of a specific set of devices that are constructed to carry out a specific task. A filter graph is composed of device filters corresponding to these devices, and the filter graph connects these device filters via their respective input and output pins. Processor 10 may run a process called a filter graph manager, which constructs the filter graphs and provides a generic interface for the various device filters that are included in the filter graph. Thus, the filter graph manager in the present invention is very similar to the filter graph managers that are utilized in the DIRECTSHOW™ context. Once processor 10 constructs the filter graph in accordance with the present invention, The filter graph manager may invoke generic commands such as "play," "pause," "stop," "record," etc to the filter graphs to render the data. The play command causes the filter graph manager to issue appropriate commands to each device filter in the filter graph. Then, it is up to each device filter to decide how to translate the play command into device-specific commands.

Thus, in this example, processor 10 may control set-top box 40 and television 50 by issuing these generic commands to the filter graph manager to control the newly-constructed filter graph to carry out the user's verbal command. The pins of the device filters in the filter graph model the actual connections between the devices, allowing the data to be sent from the output pin of one device to an input pin of another device without requiring the data to be sent through the computer.

Filter graphs may also be stored on storage device 20 for future usage, and integrity-checked before invoking any commands by comparing the connections in the filter graph to the stored connections in topology table 90.

Filter graphs also implicitly contain information about the device filters needed to perform a specific task. This feature may be exploited for certain A/V devices that may be scheduled. For example, the user may have programmed a VCR to record a program at a certain time. However, the user may forget and start watching a program that conflicts with the scheduled recording. At some point before processor 10 begins to perform the recording, processor 10 may determine if any of the device filters are in use and conflict with other activities, and notify the user of the conflict so that the user may resolve it before the conflict actually occurs.

In addition, device filters may include an optional Time field in contents table 80. This Time field may contain information regarding when the specific content is available. This information may be checked before constructing a filter graph to verify that the content requested by the user is available at whatever time requested by the user, and then processor 10 may notify the user if this is not the case.

This method according to the present invention provides a more simplified method of controlling various A/V devices than in conventional methods. By constructing the appropriate filter graph for specific verbal commands at runtime, the method according to the present invention does not require the user to use the low-level device-specific commands required to operate and integrate the various A/V devices, and allows the user to easily operate a set of A/V devices with a single command.

Figure 7:
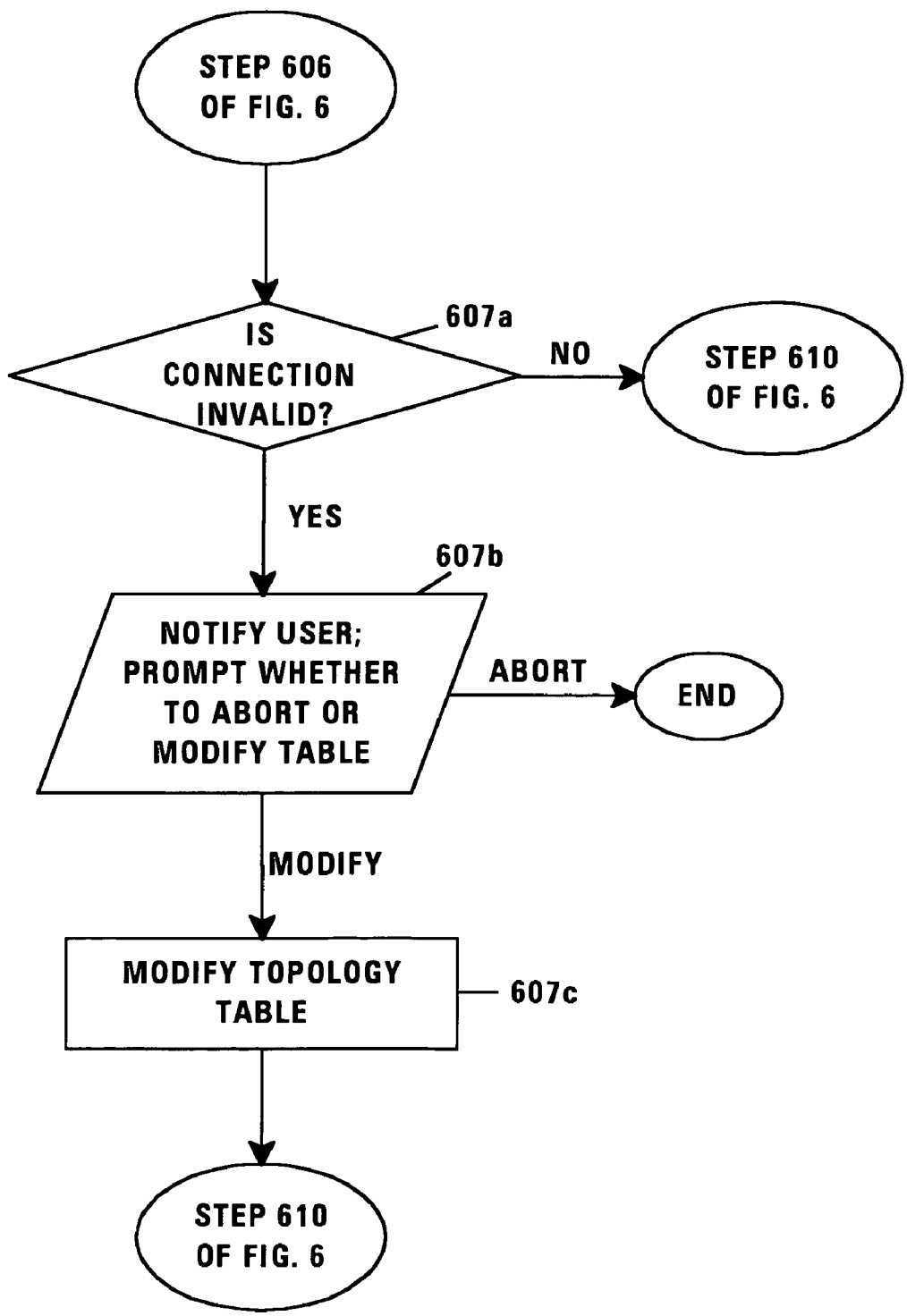
FIG. 7 shows a flowchart for an alternative method of the present invention.

In an alternative embodiment of the method shown in FIG. 7, before processor 10 begins construction of the filter graph, processor 10 may first determine whether a connection between the source device filter and the target device is valid (i.e., possible). For example, in an alternative system to the one shown in FIG. 5, there may be two televisions and set-top box 50 may only be connected to one of these televisions. Therefore, it would not be possible to watch the CNN® channel on the television that is not connected to the set-top box. The following optional steps to perform the validity check may be performed after step 606 of FIG. 6. At step 607a, processor 10 determines whether the verbal command is valid based upon the information in topology table 90. This determination may be performed by simply tracing the pin connections in the topology table to verify that a series of pin connections can be made between the source filter and a device filter corresponding to the target device.

If there is no possible connection, then at step 607b, processor 10 informs the user that the connection is invalid based upon the current information in topology table 90, and asks the user whether to abort the verbal command or modify current topology table 90 (because it may not correspond to the current arrangement of devices due to some change in the user's A/V system that was not inputted into the topology table 90) to add an appropriate connection. If the user chooses to modify the current topology table 90, processor 10 may then update the topology table 90 at step 607c in any of the methods discussed above with respect to adding new entries into topology table 90, and then proceed to step 610 of FIG. 6. Otherwise, the program may end if the user chooses to abort the current command at step 607b. This type of tracing procedure may also be utilized with the previous embodiment to create a "skeleton" filter graph before connecting the pins. By tracing through the pin connections in topology table 90, processor 10 may quickly determine which a "path" through a set of device filters necessary to render the desired content. Then, the filter graph construction may be completed by connecting the pins of the various device filters.

The present invention may further simplify the process of controlling the various A/V devices by using the user's location as an additional factor in constructing filter graphs. Processor 10 may determine the user's location in various conventional ways. For example, the user's location may be determined using motion detectors, or based upon the known location of the microphone that picked up the verbal command.

Once the user's location has been determined, the processor 10 may construct the appropriate filter graph with less information from the user than the information required in the above example. For example, if the user were to merely say "Watch CNN®" while in the living room, processor 10 may determine from the location field in device filters table 60 that the only target device having a location field containing "Living room" and that supports the "watch" activity is television 50. In this manner, the present invention may resolve ambiguities in the user's verbal commands based upon the user's location.

In addition, the present invention may simplify the process even more by using the information in topology table 90 to resolve ambiguities in the user's command. For example, suppose there are two televisions, but only one television is connected to set-top box 50. If the user issues the verbal command, "Watch CNN®," processor 10 may then determine that the next device filter to add to the filter graph is the one corresponding to the only television that has a connection to set-top box 50.

A further alternative embodiment that may also be used according to the present invention is shown in FIGS. 8 and 9, which depict an alternate device filters table 100 and an alternate pins table 110 that may be used with the previous embodiments instead of device filters table 60 and pins table 62. In this embodiment, instead of modeling the physical topology of the various A/V devices using topology table 90, the physical topolgy may be modeled through the use of a medium field in pins table 110. This medium field for a particular pin may contain an identifier which identifies a specific linking medium which connects this pin to another pin in the pins table. So for example, the VideoOut pin (i.e., PIN1) of the Set_top_box device filter may be connected to the VideoIn pin (i.e., PIN4) of the TV_1 device filter by a cable. In this embodiment, this may be represented by an entry M1 in the medium fields for both PIN1 and PIN4 to indicate that these pins are connected by the M1 cable. Thus, this embodiment may create filter graphs as a function of the medium fields in alternate pins table 110 instead of using the entries in topology table 90.

In addition, alternate pins table 110 or pins table 62 may also include a flow type field, as shown in FIG. 9, which may be used to further validate pin connections in creating filter graphs. The flow type field may indicate if a specific pin is an input or an output pin, so that as filter graphs are constructed or as entries are added into either pins table 62, 110, processor 10 may notify the user if there is an incompatible connection of pins (i.e., an input pin connected to another input pin, or an output pin connected to another output pin).

In the foregoing description, the system and method according to the present invention has been described with reference to specific examples. It is to be understood and expected that variations in the principles of the system and method herein disclosed may be made by one skilled in the art and it is intended that such modifications, changes, and substitutions are to be included within the scope of the present invention as set forth in the appended claims. The specification and the drawings are accordingly to be regarded in an illustrative rather than in a restrictive sense.

What is claimed is:

1. A method for controlling at least two audio/video ("A/V") devices to render a desired content, comprising:
   constructing a filter graph of said at least two A/V devices as a function of a connection topology of said at least two A/V devices and said desired content; and
   controlling said at least two A/V devices via said filter graph to render said desired content on one of said at least two A/V devices.

2. The method according to claim 1, wherein constructing said filter graph includes:
   connecting at least two device filters corresponding to said at least two A/V devices.

3. The method according to claim 2, wherein each of said at least two device filters includes predetermined characteristics of a corresponding one of said at least two A/V devices.

4. The method according to claim 3, wherein said predetermined characteristics of each of said at least two device filters includes at least one of an input pin and an output pin.

5. The method according to claim 4, wherein said at least two device filters are connected by connecting said at least one of said input pin and said output pin of one of said at least two device filters to said at least one of said input pin and said output pin of the other one of said at least two device filters.

6. The method according to claim 3, wherein said predetermined characteristics of each of said at least two device filters includes a media type, and wherein said filter graph is constructed as a further function of said media type of at least one of said at least two device filters.

7. The method according to claim 3, wherein said predetermined characteristics of each of said at least two device filters includes a location, and wherein said filter graph is constructed as a further function of said location of at least one of said at least two device filters.

8. The method according to claim 1, wherein said desired content is determined as a function of a user input.

9. The method according to claim 8, wherein said user input is a verbal command, the method further comprising: determining said rendered content as a function of said verbal command.

10. The method according to claim 9, further comprising:
    determining a desired activity as a function of said verbal command,
    wherein said filter graph is constructed as a further function of said desired activity.

11. The method according to claim 9, further comprising:
    determining a target device as a function of said verbal command,
    wherein said target device indicates which of said at least two A/V devices renders said desired content.

12. The method according to claim 1, further comprising:
    determining a user location,
    wherein said filter graph is constructed as a further function of said user location.

13. The method according to claim 1, further comprising:
    validating said filter graph as a function of said connection topology.

14. The method according to claim 1, wherein the processor controls said at least two A/V devices via a command transmission device.

15. The method according to claim 1, wherein said command transmission device includes at least one of a serial cable, an infrared transmitter and a radio frequency transmitter.

16. A set of instructions residing on a storage medium, said set of instructions capable of being executed on a processor to implement a method for controlling at least two A/V devices to render a desired content, the method comprising:
    constructing a filter graph of said at least two A/V devices as a function of a connection topology of said at least two A/V devices and said desired content, and
    controlling said at least two A/V devices via said filter graph to render said desired content on one of said at least two A/V devices.

17. The set of instructions according to claim 16, wherein constructing said filter graph includes:
    connecting at least two device filters corresponding to said at least two A/V devices.

18. The set of instructions according to claim 17, wherein each of said at least two device filters includes predetermined characteristics of a corresponding one of said at least two A/V devices.

19. The set of instructions according to claim 18, wherein said predetermined characteristics of each of said at least two device filters includes at least one of an input pin and an output pin.

20. The set of instructions according to claim 18, wherein said predetermined characteristics of each of said at least two device filters includes a location, and wherein said filter graph is constructed as a further function of said location of at least one of said at least two device filters.

21. The set of instructions according to claim 19, wherein said at least two device filters are connected by connecting said at least one of said input pin and said output pin of one of said at least two device filters to said at least one of said input pin and said output pin of the other one of said at least two device filters.

22. The set of instructions according to claim 16, wherein said desired content is determined as a function of a user input.

23. The set of instructions according to claim 22, said processor further determining a desired activity as a function of said verbal command, wherein said filter graph is constructed as a further function of said desired activity.

24. The set of instructions according to claim 16, wherein said user input is a verbal command, wherein said processor further determines said rendered content as a function of said verbal command.

25. The set of instructions according to claim 16, said processor further determining a user location, wherein said filter graph is constructed as a further function of said user location.

26. The set of instructions according to claim 16, said processor further validating said filter graph as a function of said connection topology.

27. The set of instructions according to claim 16, wherein said processor controls said at least two A/V devices via a command transmission device.

28. A system for controlling at least two A/V devices to render a desired content, comprising:

a processor;

a storage device coupled to said processor; and a command transmission device coupled to said processor and said at least two A/V devices, wherein said processor constructs a filter graph of said at least two A/V devices as a function of a connection topology of said at least two A/V devices and said desired content, and wherein said processor controls said at least two A/V devices via said filter graph to render said desired content on one of said at least two A/V devices.

29. The system according to claim 28, wherein said command transmission device includes at least one of a serial cable, an infrared transmitter and a radio frequency transmitter.

30. The system according to claim 28, further comprising a communication device coupled to said processor.

* * * * *